United States Patent [19]
Toh

[11] Patent Number: 5,387,930
[45] Date of Patent: Feb. 7, 1995

[54] ELECTRONIC IMAGE ACQUISTION SYSTEM WITH IMAGE OPTIMIZATION BY INTENSITY ENTROPY ANALYSIS AND FEEDBACK CONTROL

[75] Inventor: Peng S. Toh, Maidstone, Great Britain

[73] Assignee: European Visions Systems Centre Limited, London, England

[21] Appl. No.: 934,668
[22] PCT Filed: May 28, 1991
[86] PCT No.: PCT/GB91/00846
  § 371 Date: Jan. 25, 1993
  § 102(e) Date: Jan. 25, 1993
[87] PCT Pub. No.: WO91/19262
  PCT Pub. Date: Dec. 12, 1991

[30] Foreign Application Priority Data

May 25, 1990 [GB] United Kingdom ............... 9011842
Dec. 20, 1990 [GB] United Kingdom ............... 9027599

[51] Int. Cl.⁶ ............................................ H04N 5/235
[52] U.S. Cl. .................................... 348/207; 348/222; 348/229
[58] Field of Search ............... 358/227, 228, 166, 174, 358/169, 209, 213.11, 213.28; 348/207, 222, 229, 362

[56] References Cited

U.S. PATENT DOCUMENTS

| 4,187,519 | 2/1980 | Vitols et al. | 358/169 |
| 4,204,229 | 5/1980 | Heuze | 358/174 |
| 4,365,272 | 12/1982 | Nagai | 358/228 |
| 4,649,426 | 3/1987 | Bolstad | 358/101 |
| 4,975,773 | 12/1990 | Rabii | 358/169 |
| 4,998,162 | 3/1991 | Kondo et al. | 358/227 |
| 5,101,276 | 3/1992 | Ohta | 358/209 |

Primary Examiner—Michael T. Razavi
Assistant Examiner—Wendy R. Greening
Attorney, Agent, or Firm—Pollock, Vande Sande & Priddy

[57] ABSTRACT

An image acquisition system is arranged to optimize the information in an acquired image. Parameters associated with the system, such as any of the lens aperture, the lens focus and image intensity, are adjusted. Incoming image data is processed to determine the entropy of the image and with this information the aperture can be optimized. By determining the dynamic range of the scene the black and white levels thereof can be identified and the gain and offset applied to the image adjusted to minimize truncation distortion. Specular highlights can be detected by calculating the ratio of changes in maximum and minimum intensities between different but related images.

23 Claims, 6 Drawing Sheets

ELECTRONIC IMAGE ACQUISTION SYSTEM WITH IMAGE OPTIMIZATION BY INTENSITY ENTROPY ANALYSIS AND FEEDBACK CONTROL

FIELD OF THE INVENTION

The invention relates to an image acquisition system.

BACKGROUND OF THE INVENTION

In the field of machine vision, extensive work has been carried out in researching the interpretation of images acquired from an image source such as a video or other electronic camera. In many hitherto known machine vision systems the operation of the system has concentrated on the processing of images acquired from a source without any interaction between the processor and the source. Thus, the system has operated in an essentially passive manner with the source parameters such as camera aperture being adjusted independently from the processing on the basis of say the average light intensity of a scene.

In many circumstances adequate information can be obtained from a passive source by moving the viewing position and acquiring further images representing different views of a scene. Indeed, multiple views of a scene are always required if three-dimensional information about the scene is to be obtained. However, in adopting an essentially passive approach to image acquisition, information about a scene may be lost in an acquired image, thereby creating many problems which must be resolved by image processing in order to obtain valid information from the image.

A passive source will not necessarily provide optimal images for interpretation by the system. This is because for example scene illumination varies widely between that of a sunny day when the scene will contain high contrasts and that of a moonlit night. Typically, video image sources are arranged to respond to say the average illumination of a scene or to the illumination at a point in the scene and will thus supply very different images representing the same scene under these two extremes of illumination. Similarly, poor images may be acquired where objects in a scene have widely varying reflectance. Some objects may have highly specular aspects (i.e. reflections of the light source illuminating the object) and others may be highly diffused in nature (i.e. substantially no specular reflections). Whilst most scenes and most objects fall between these extremes there may still be problems with for example specular reflections being interpreted as edges where there are in fact none and edges or other features not being detected when they do in fact exist.

In order to overcome these difficulties image processing software has been developed which makes various assumptions about a scene represented by an acquired image. One reason why this approach has been adopted is that there is a belief commonly held by those in the art of machine vision that any viewing mechanism capable of being implemented can be simulated entirely by software. Whilst it is indeed possible to implement many aspects of observation by way of software applied to images acquired from an essentially passive source, this approach is limited in that it is difficult to remove false information such as specular edges, or to replace missing information such as undetected edges in such an acquired image. This problem stems from the fact that once a poor image has been acquired it is difficult to transform it into a good image from which scene information can be extracted.

SUMMARY OF THE INVENTION

The present invention resides in the realization that machine vision can be optimized by providing interaction between the image source and the image processing thereby providing an active image acquisition system from which images containing optimum scene information can be obtained. To this end, the invention provides for interaction between an image acquisition device, for example a camera, and an image processing device. In this way optimal images can be obtained for further processing without the need to make restrictive assumptions about the scene represented by the image.

Thus, the present invention resides in the realization that the extraction maximum information from a scene is the optimization of photometric properties of images acquired by an image source. Once optimal images have been acquired maximum information about a scene can be extracted therefrom.

According to one aspect of the invention there is therefore provided a method of controlling an image acquisition system to optimize the information in acquired image data, in which method parameters associated with the system are adjusted and incoming image data is processed to calculate therefrom at least one value associated with the entropy of the image, the parameters being adjusted so that the value associated with the entropy tends toward an optimum value.

According to another aspect of the invention there is provided a controller for an image acquisition system, the controller comprising processing means for processing incoming image data to calculate therefrom at least one value associated with the entropy of the image, and adjusting means for adjusting parameters associated with the system to optimize said at least one value and thereby to optimize the information in the acquired image.

In a further aspect, the invention provides an image acquisition system comprising an image source from which image data is input to an amplifier having an adjustable gain and/or offset, the image data being processed to calculate parameters from the entropy of image intensity values which parameters are used to control adjustment of either of the gain and/or offset of the amplifier thereby to adjust the response of the source to incoming images and to optimize the dynamic range in the acquired image data.

The invention also provides an image acquisition system comprising an electronic camera having an associated amplifier and quantizer for outputting digital data representing an acquired image, and a processor for processing the digital data to calculate parameters which are used to adjust the characteristics of either the camera or the amplifier or both in order to optimize the amount of information in the acquired image.

Furthermore, the invention provides a method of detecting a specular highlight in a scene, the method comprising acquiring a first image representing the scene by way of an image acquisition system set up in accordance with first known parameters, acquiring a second image representing the scene by way of the acquisition system set up in accordance with second known parameters, calculating the dynamic range of the first and second images and the ratio of the dynamic ranges, and comparing intensity values in the scene with a reference value derived from said ratio to identify a specular highlight as an intensity value exceeding said reference.

Also, the invention provides an image acquisition system in which images are input from an image source comprising an amplifier having an adjustable gain and/or offset, the images being input as image data which is processed to calculate the intensity dynamic range in a first image from the source set up in accordance with first known parameters and in a second image set up in accordance with second known parameters, and data relating to the calculated dynamic ranges is used in the adjustment of the gain and/or offset of the amplifier thereby to adjust the response of the source to incoming images to optimize information in the acquired images.

The above and further features of the invention are set forth with particularity in the appended claims and together with advantages thereof will become clearer from consideration of the following detailed description of exemplary embodiments of the invention given with reference to the accompanying drawings.

DETAILED DESCRIPTION OF AN EMBODIMENT OF THE INVENTION

Figure 1:
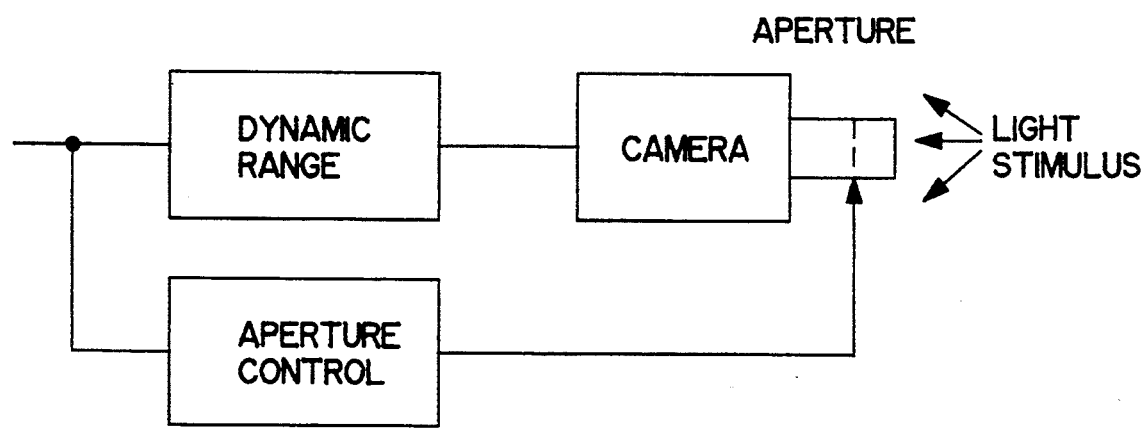
FIG. 1 is a generalized schematic diagram of a system embodying the invention.

Referring now to FIG. 1 of the accompanying drawings, an image acquisition system 1 comprises a video camera 2 or other electronic image source responsive to light stimulus for providing image data representative of a scene. The image data from the camera is input to a dynamic range controller 3 which, as will become clearer from the further description that follows, is arranged to adjust the dynamic range of the image data from the camera and to deliver the adjusted data for further processing by any suitable image processing system. Generally, the dynamic range controller 3 is arranged to define the maximum and minimum limits of light intensity represented by the image data by offsetting these limits depending on the ambient light conditions associated with the scene. Image data from the dynamic range controller 3 is also input to an aperture controller 4 which controls among other things the aperture 5 of the camera lens thereby controlling the amount of light falling on light sensors (not shown in FIG. 1) in the camera 2. The system 1 thus provides for continuous closed loop adjustment of paramets associated with the camera 2 and the image data output from the camera. It should be noted that the most significant part of the adjustment of the system is provided by the data adaptation by the dynamic range controller 3 as will now be described in greater detail.

Figure 2:
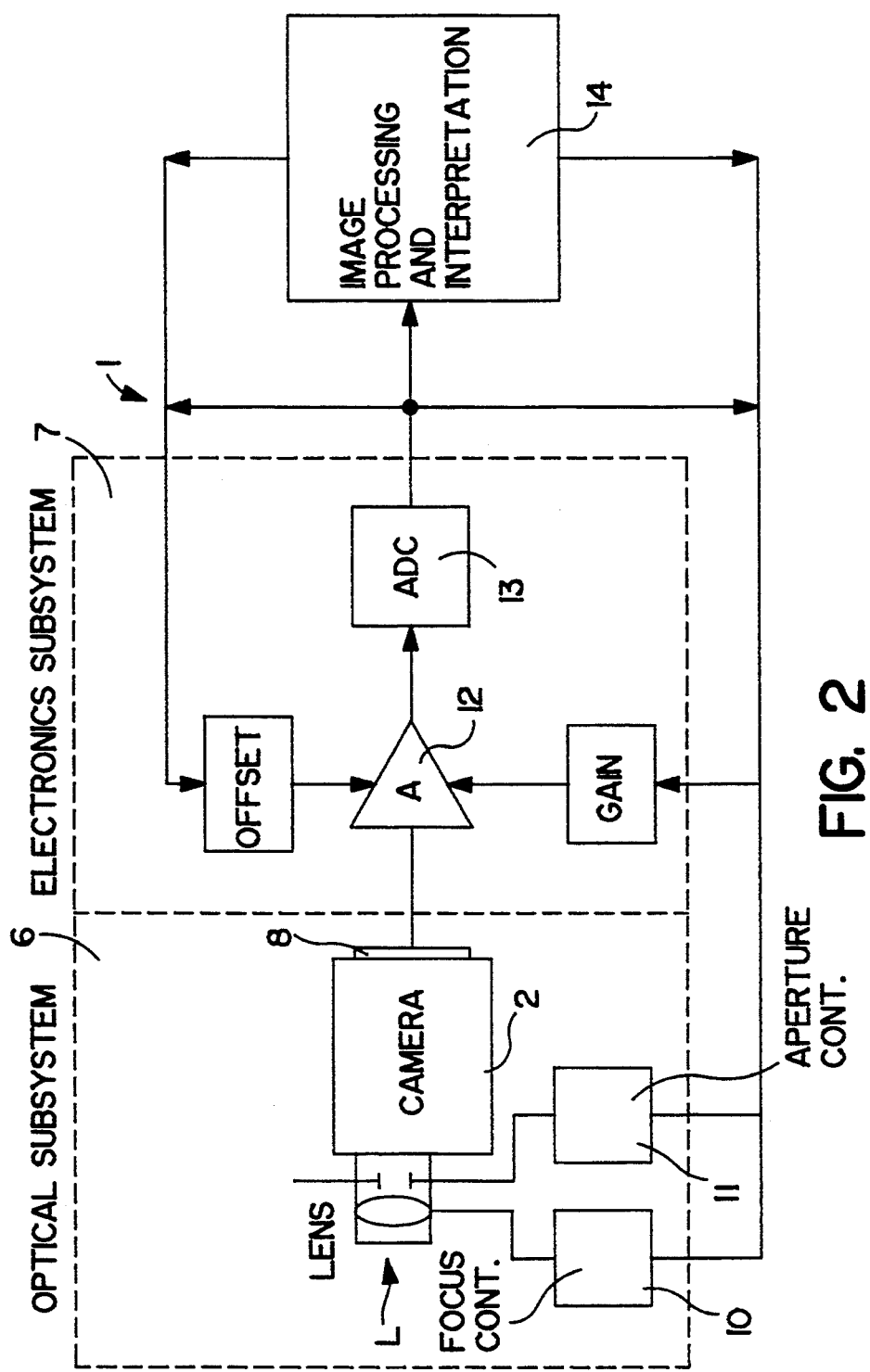
FIG. 2 is a more detailed schematic diagram of the system of FIG. 1.

Turning now to FIG. 2 of the accompanying drawings the image acquisition system 1 can be divided into an optical sub-system 6 and an electronics sub-system 7.

The system 1 also comprises an image processing and interpretation sub-system 14 which receives data from the electronics sub-system 7 and processes that data to extract scene information therefrom. The sub-system 14 may be any suitably configured data processor capable of performing at least the calculations to be described in greater detail hereinafter.

The optical sub-system 6 consists of a photodetector array 8 or CCD and a lens assembly 9 which includes focus and aperture controls 10,11. The main components in the electronics sub-system are a video amplifier 12 and an analog-to-digital converter ADC 13. Both sub-systems 6,7 are involved in the control and transformation of the dynamic range of the image data representing a scene. For the purpose of explanation it will be assumed that the transfer characteristics of the photodetector array 8 and of the analog to digital converter 13 or quantizer are linear, though it should be noted that devices with non-linear characteristics may instead be used if required.

The focus control and aperture control are represented in FIG. 2 as appropriately labelled boxes 10,11. It will be appreciated by those skilled in the art that these controllers are responsive to the digital image data output from the ADC 13 and are in fact a suitably configured processor or processors arranged to interpret the data from the ADC 13 and in response thereto to output control signals for driving actuators associated with the focusing and aperture setting of the lens 9. Control of offset and gain parameters of the video amplifier 12 is similarly controlled by any well known processing arrangement suitably configured.

In the following, algorithms used in the processor 14, or indeed plural processors, to control parameters of the system 1 in response to image data output from the ADC will be described. This control is done dynamically with parameters being continually updated to obtain optimum image data from the system 1.

Considering first the optical sub-system 6, it can be shown that $$I_c = L \frac{1}{4f^2(1 + m^2)} \cos^4 \alpha,$$

where $I_c$ is the intensity of the image L is the luminance of the image, f is the aperture or f-number of the lens, m is the magnification factor of the lens expressed as the ratio of the image to lens distance over the lens to object distance, and $\alpha$ is the angle subtended by the incident ray and the optical axis.

Usually m is very small because the object distance is much greater than the image distance. Assuming the field of view is small, the cosine term is approximately unity. $I_c$ can then be approximated to $L/4f^2$. The aperture is therefore the most significant parameter governing behavior of the optical sub-system 6.

Turning briefly to the electronics sub-system, operation of the video amplifier 12 can be controlled by controlling offset and amplification or gain of the amplifier 12. In particular, the offset and amplification can be used to establish black and white reference levels which are used to clamp the video signal thereby limiting the dynamic range of the system. Finally, the video signal output from the amplifier 12 is quantized and coded digitally by the ADC 13 and by selecting the quantization characteristics of the ADC 13 operation of the system can be further altered.

Figure 3:
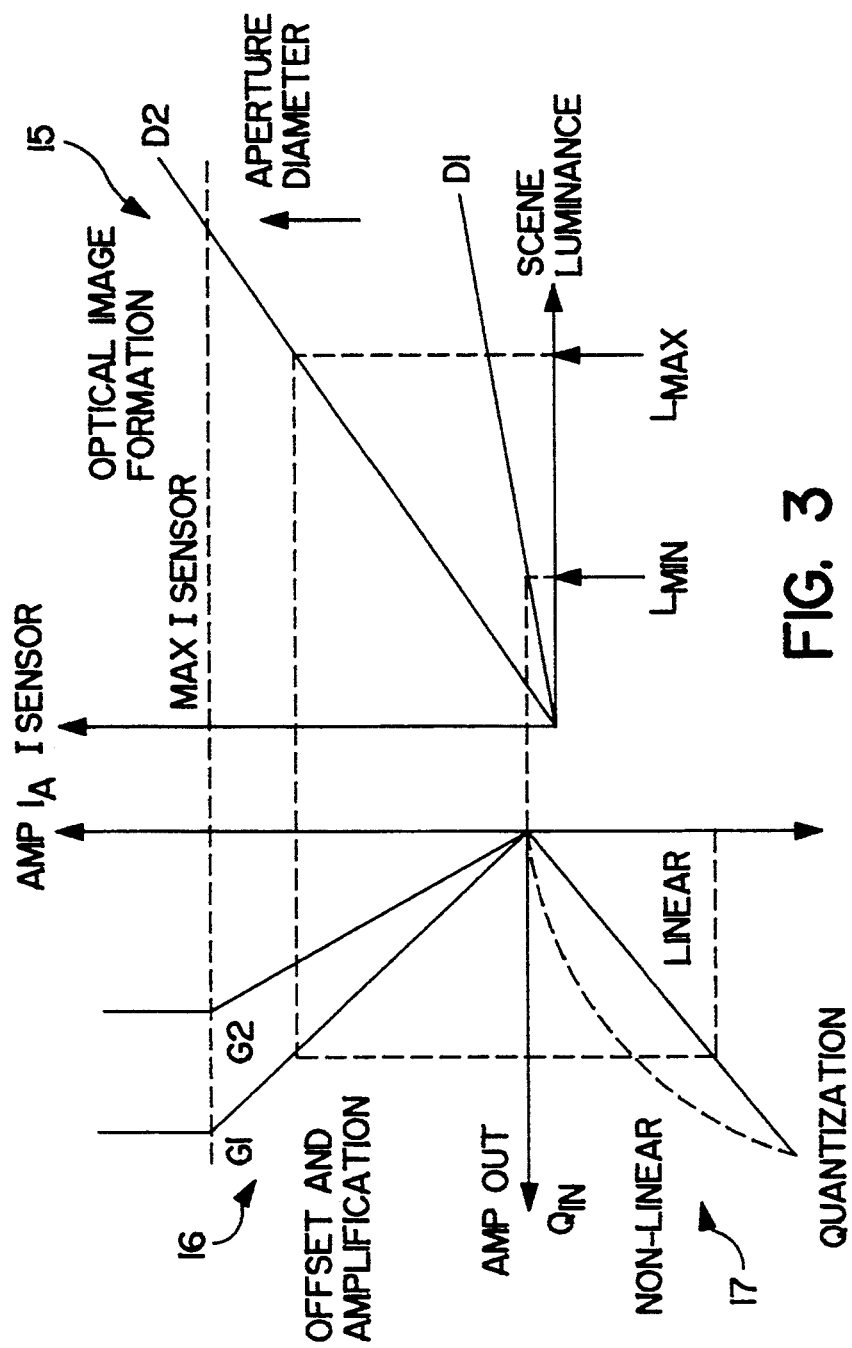
FIG. 3 is graphical representation of the transfer characteristics of components of the system of FIG. 2.

The conversion process performed by the system 1 is represented graphically in FIG. 3 of the accompanying drawings. Referring now to FIG. 3 of the drawings, the graph 15 in the first quadrant shows the transfer characteristic of the optical sub-system 6 for two aperture sizes D1 and D2. The image is formed on the CCD 8 which converts light intensity into an electrical signal $I_{sensor}$. The electrical signal $I_{sensor}$ (a voltage signal) is output to be processed by the video amplifier 12. The transfer characteristic of the video amplifier 12 is shown by the graph 16 in the second quadrant for two different gain settings G1 and G2. By adjusting the offset of the amplifier 12 and selecting an appropriate gain setting the dynamic range of the electronics sub-system 7 can be altered to suit the ambient light conditions of the scene. The graph 17 in the third quadrant depicts the quantization characteristic of the ADC 13. A linear characteristic is commonly used but a non-linear characteristic may instead be used if required.

Figure 4:
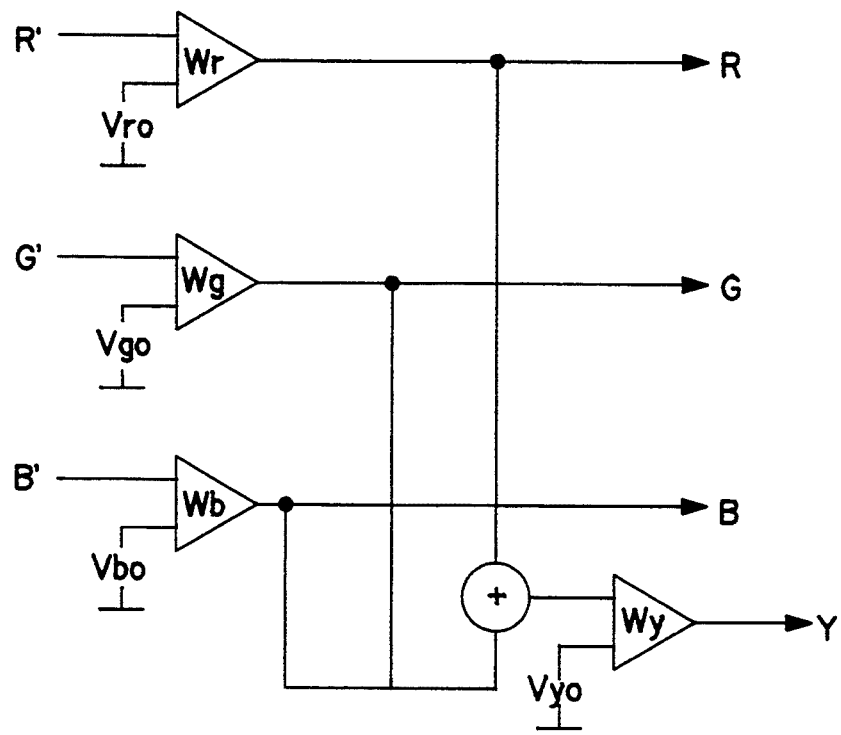
FIG. 4 is a schematic diagram of a color corrected circuit.

For the purpose of explanation the system so far described has been limited to monochrome images. In practice it is often desirable to use color images and the system can be readily modified to operate on such images. As shown in FIG. 4 of the accompanying drawings, a separate amplifier Wr, Wg and Wb can be provided for each of the red, green and blue color components output from a color camera. It will be appreciated that these amplifiers each have associated gain and offset controllers (not shown) which adjust the parameters of each amplifier to correct the incoming color component signals R', G', B' to produce corrected color components R,G,B which are each output via respective ADC's to the image processing and interpretation unit 14 for further processing and analysis.

Any shade of grey, i.e. achromatic signal varying from back to white, is defined as having equal amounts of energy in R, G and B. In order to satisfy this requirement for different scene illuminants, a weighting factor can be applied to each color channel. With reference to FIG. 4 of the accompanying drawings the uncorrected color inputs are R'G'B' and the corrected outputs R,G,B are:

$R = W_r R'$,
$G = W_g G'$,
$B = W_b B'$.

Color correction or white balance adjustment can be effected through either hardware or software. To this end, a fourth amplifier $W_y$ is also provided in the circuit shown in FIG. 4. The fourth amplifier $W_y$ is driven by the summation of the RGB signals to provide a signal Y representing the luminance of the scene. As will be appreciated from the discussion regarding specular reflections that follows hereinafter, the spectral of a specular reflection can be defined as the standard white value of a scene. This is because the spectral of a specular reflection is essentially that of the light source illuminating the scene. Once the spectral of the light source has been determined, in a manner to be described in greater detail hereinafter, it can be compared to the value of Y output from the amplifier $W_y$ and the gain and offset of each of the other amplifiers $W_r$, $W_g$, $W_b$ can be adjusted to obtain a value of Y that corresponds to that of the source illuminating the scene. In practice this can be done by adjusting the gain of each amplifier such that:

$W_r R'_s = W_g G'_s = W_b B'_s = 1/3 \, Y$

In other words, each corrected color is normalized to one third of the total luminance Y. Without loss of generality, Y is further normalized to unity to give, $$W_r = \frac{1}{3R'_s},$$

$$W_g = \frac{1}{3G'_s},$$

$$W_b = \frac{1}{3B'_s}.$$

It will be appreciated therefore that the above discussed algorithms are applied to the image luminance signal y output from its respective ADC 13 to the image processing unit 14 and the results thereof can be used to adjust the setting of the aperture of the lens 9, and the gain and offset of the amplifier 12 to optimize the information content of and acquired color image.

There are two parameters that in general define image quality namely fidelity and intelligibility. Although much work has been done on the development and assessment of quantitative measures of gray level image quality, little work has been done to relate image fidelity and intelligibility to the performance of the image acquisition system in the recovery of the scene's intensity dynamic range. In other words, quality should be measured in terms of the goodness of intensity adaptation in optimizing contrast sensitivity and in reducing dynamic range distortion.

In hitherto known systems control of the aperture has relied on the mean value of the image intensity which is adjusted to the mean value of the image acquisition system dynamic range. This is unsatisfactory for the purpose of image processing because the abovementioned two competing aspects of quality are not considered. Manual aperture adjustment is also unsatisfactory because it is subjective and highly dependent on the device used to display the image, e.g. a display monitor.

An optimum digital image must preserve the dynamic range of a scene in order to achieve high fidelity. On the other hand, it must also achieve high intelligibility in terms of carrying maximum image information using the limited number of bits of information available to the system. These two requirements are usually in conflict. A real scene (e.g. a natural scene) may have an extremely large dynamic range, and if this range is to be completely covered it will be poorly represented by a small number of bits per pixel. To solve the conflicting requirements new criteria are needed for controlling the camera aperture and the video signal offset and gain (black/white reference). In this way, the criteria will control the intensity dynamic range of the recovered information.

The operation of the system as so far described has assumed that the scene is composed of objects having a substantially even and finite range of reflectivities. In reality, a scene may comprise a wide range of different objects with widely different reflectivities and orientations. The two extremes of reflectance are Lambertian where light is reflected from a diffuse surface and is therefore in itself diffuse, and specular where light is reflected from a shiny surface and is therefore substantially an image of the light source. Since most materials have a reflectance which lies between the two extremes of Lambertian and specular it is realistic to model any reflection by a sum of specular and Lambertian components. Lambertian reflection, also known as or body reflection, depends only on the surface geometry of the object and the light source direction, and is independent of the viewing direction. Specular reflection is not only dependent on the angle of the incidence light and the surface orientation, but is also dependent upon the viewing angle. For certain materials at certain viewing angles, the reflection due to the specular component dominates over the diffuse component and this shows up on the acquired image as a very bright region which is called a specular highlight.

Most computer vision algorithms assume a Lambertian reflectance for object surface. Specular highlights, when they occur, occupy only a relatively small area of an image. The presence of specular highlight may be seen as a form of discontinuity in the Lambertian assumption which is analogous to a depth discontinuity in the assumed smoothness in the scene. In very much the same way as detecting discontinuities and applying the smoothness assumption piecewise, a specular highlight has to be located in the image and the Lambertian assumption applied elsewhere. The advantage of having a specular highlight region detected is that separate algorithms which do not depend on Lambertian assumptions can then be applied to these areas.

Most previous detection methods can be classified as passive. The obvious advantage of passive detection is that analysis is performed directly on whatever image has already been captured. The disadvantage is that the photodetector array or CCD 8 may be saturated by the strong highlight intensity and there is no means of controlling this adverse effect. Whenever a scene has a specular reflection, the scene intensity dynamic range tends to be very large. The specular reflection intensity can usually saturate most image sensors and consequently this will distort the spectral content of the image. If saturation occurs, it is impossible to recover the illuminant spectral even though the specular reflection can be detected.

One known method of detecting specular reflections by using Lambertian constraints is that developed by Breslaff and Blake. The Breslaff and Blake method identifies specular reflections as those regions where Lambertian assumptions are violated. The Breslaff/-Blake Lambertian constraint is based on the argument that the strength of specularity deviates from the Lambertian model by more than a factor of say 30 (a factor of 3 for illumination dynamic range and a factor of 10 for material albedo variation).

The present invention makes use of the Breslaff/-Blake Lambertian constraint. A technique of measuring the scene dynamic range is also used to make use of the Lambertian constraint. As will become clearer from the following description this method also requires active control of the camera aperture and the black/white references so that truncation distortion, i.e. underexposure and saturation, can be prevented and the illuminant color can be correctly estimated.

A specular reflection has different characteristics to that of a non-specular reflection because a non-specular reflection and is apparent locally as well as globally. Since a specular patch is a reflection of a point source, the major differences that distinguish a specular reflection in terms of local characteristics are that:

1) its color is no longer the same as the surface color, assuming that the color of the light source is different from the color of the specular reflection;

2) its intensity is very much stronger than intensity in the neighborhood of the reflection which means that there is a high local contrast; and 3) the focal distance of a specular highlight or reflection is greater than the distance to the surface and when the focus is adjusted beyond the distance of the surface, the intensity of the specular reflection will appear to be intensified (Like a mirror surface where the reflected image is twice the object distance).

In terms of global characteristics, the global contrast and dynamic range of a scene including specular reflections or highlights will tend to be very large. The dynamic range of a scene will be very large if there are specular reflections and shadow regions. It can be shown that the dynamic range of a scene can be defined by the equation:

$$n = \frac{S_p}{S_a} * \frac{P_{max}}{P_{min}}$$

Where
$S_p$ = point source high intensity
$S_a$ = ambient source high intensity
P = specular coefficient The dynamic range of a scene is therefore dependent on the scene.

Since the above dynamic range expression is derived for a point source, it can be shown that an extended light source having the same spectral distribution can be approximated to a point source.

However, it has been pointed out that contrast is important in the perception of a light source and similarly of a highlight. Unfortunately, the two important factors crucial to highlight detection, namely the contrast and the dynamic range of a scene, as opposed to that of the acquired image, cannot be measured directly from image intensity. More specifically, the contrast and the dynamic range of a scene cannot be determined correctly by the intensity of a single image.

Before continuing, a distinction between luminance and image intensity should be made. Luminance is the photometric intensity of a scene before an image is subjected to transformation by an image acquisition system. Image intensity, in a practical sense, is the digitized data representing the image, which data can be manipulated by the software directly. Because the scene contrast ($\Gamma$) and dynamic range (n) are desired, they should be measured in terms of luminance (L) rather than image intensity (Y). It can be shown that $$\text{Local contrast } \Gamma_l = \frac{L_2 - L_1}{L_2 + L_1}$$

$$\text{Global contrast } \Gamma_g = \frac{L_{max} - L_{min}}{L_{max} + L_{min}}$$

$$\text{and dynamic range } n = \frac{L_{max}}{L_{min}}$$

Where $L_1$ and $L_2$ are the scene luminance values of proximate pixels in a localized area of the image and $L_{max}$ and $L_{min}$ are the maximum and minimum luminance values in the whole image.

Luminance L cannot be measured directly from an acquired image. However, the image intensity Y can be measured and is related to the scene luminance L by an approximately linear model equation:

$$Y = AL + L_{off}$$

Where A is the gain of the amplifier or amplifiers 12 and $L_{off}$ is the offset.

Again it can be shown that $$\Gamma_g = \frac{\Delta Y_{max} - \Delta Y_{min}}{\Delta Y_{max} + \Delta Y_{min}}$$

and $$n = \frac{\Delta Y_{max}}{\Delta Y_{min}}$$

Where $\Delta Y$ is the change in intensity between two different gain settings of the amplifier 12.

Thus, the dynamic range n of the scene can be measured as a ratio of intensities in two captured images and can be used to adjust the camera parameters to obtain an optimum image. Once the scene dynamic range n has been measured, specular highlights can be detected in the image using the Breslaff and Blake Lambertian constraint such that n > 30 Presence of highlight;
n ± 30 No highlight.

Figure 7:
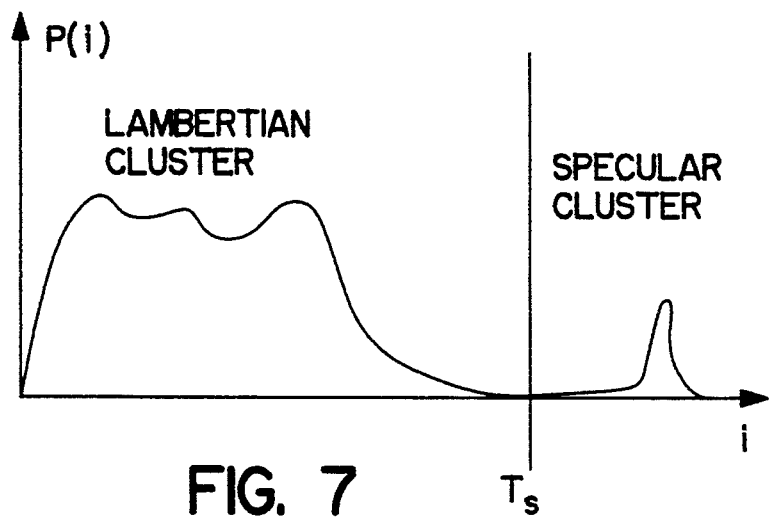
FIG. 7 shows a histogram of intensity probabilities in a typical acquired image.
Figure 6A:
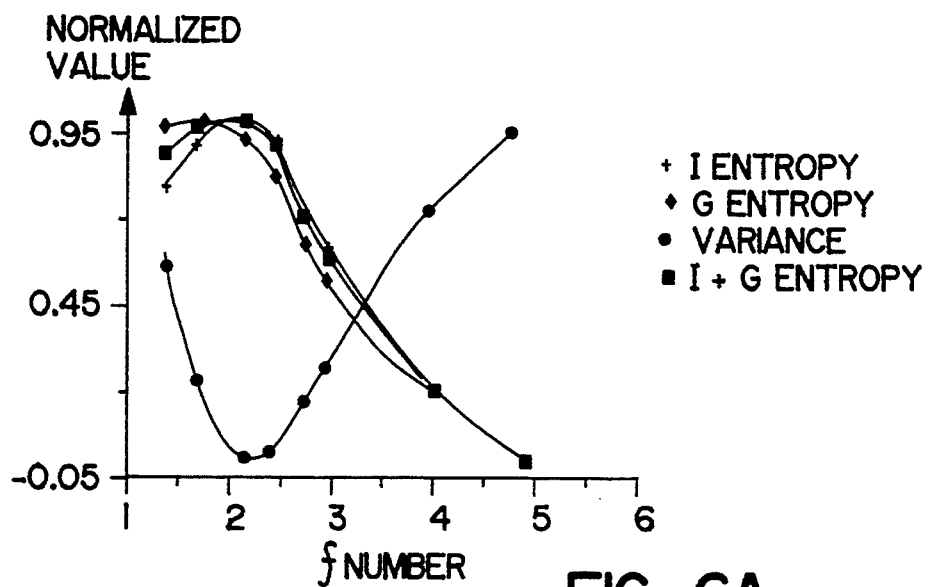
FIG. 6a–6e shows various experimental results.
Figure 6B:
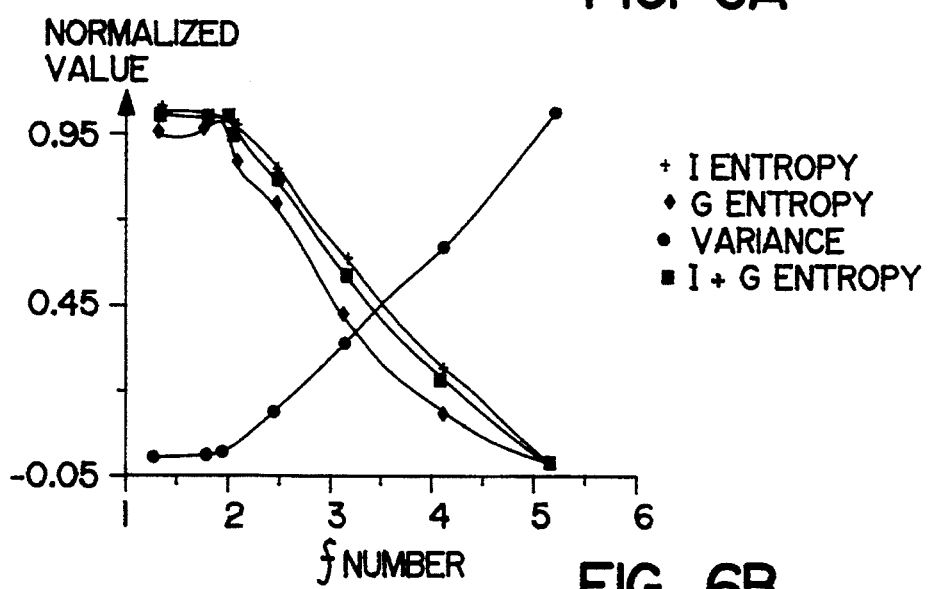
Figure 6C:
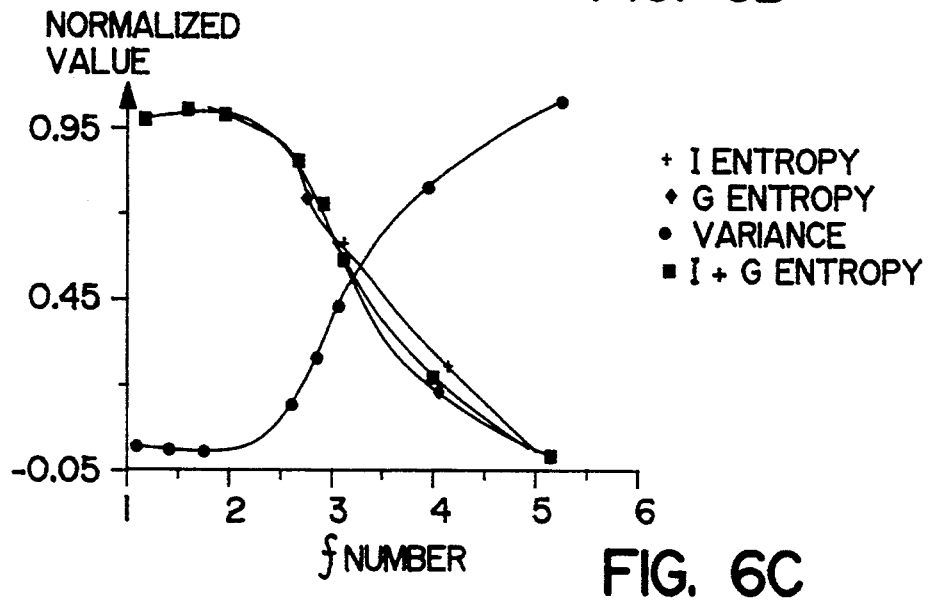
Figure 6D:
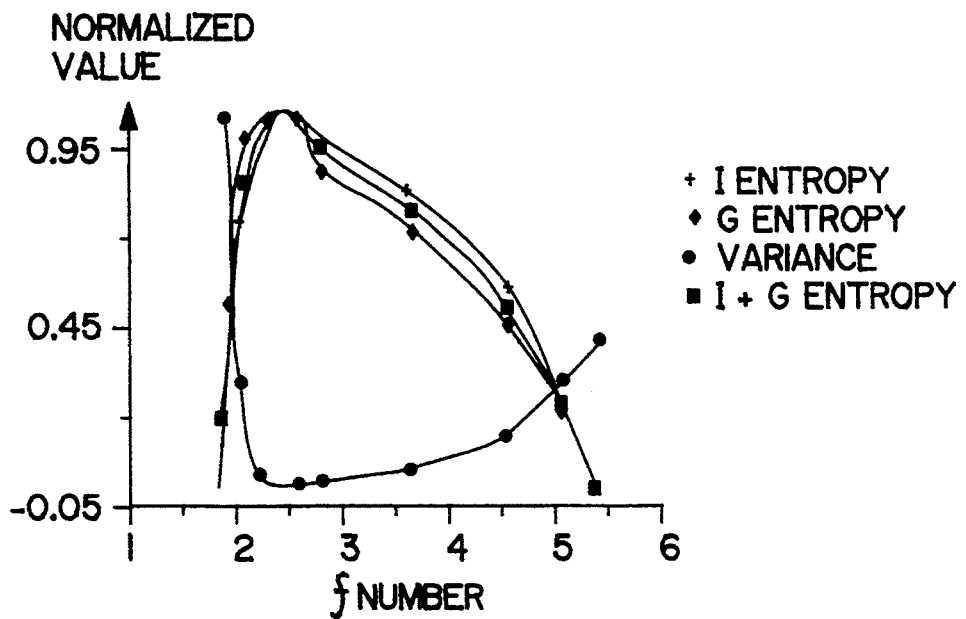
Figure 6E:
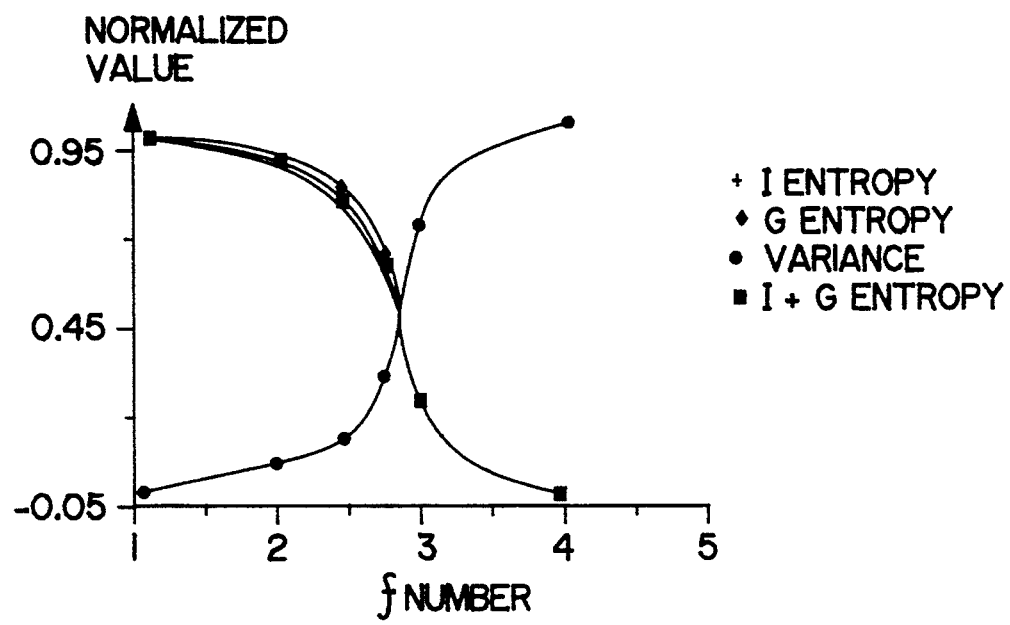

The location of a highlight in an image is obtained through thresholding. A threshold value, $T_s$, is determined from histogram analysis. As shown in FIG. 7 of the accompanying drawings, an intensity histogram is divided by the threshold value $T_s$ into two distinct clusters corresponding respectively to the Lambertian and the highlight regions. The Lambertian surfaces occupy the lower intensity value and this is the major cluster. The higher intensity cluster is due to specular highlights.

The effects of highlights is detrimental to almost every type of stereo matching algorithm, be it feature, intensity or structure based. Specular highlights not only suppress the body color which is the desired color, but also create view-point dependent primitives such as blobs and edges whose positions change with the viewing direction. The elimination of highlights is equivalent to the elimination of these view-point dependent primitives and can be used to prevent false candidate information and false matching.

Locating specular highlights can lead to the avoidance of false matching in stereoscopic processing, and other algorithms have also been developed to process and extract valuable information, such as retrieving the geometry of the area within the neighborhood of the specular highlight.

The usefulness of detecting specular reflection can be extended to estimating the illuminant spectral distribution of the light source and can be used subsequently for white balance adjustment. If the white balance can be adjusted automatically whenever a highlight is present in a scene, then the image acquisition system can be said to have been imparted with the capability of providing consistent color to some extent.

The system can thus be further refined by first estimating the spectral distribution of the light source illumination in the scene and then correcting for color by adjusting the white balance. It is well know that the color of the brightest region in a scene can be used to produce a true criterion for judging the darker objects in the neighborhood of the brightest region. In essence, the retrieving of the color of highlights can be used to achieve color-constancy.

Specular reflection occurs as a result of near total reflection of the incident light where the material body reflectance has been almost excluded. The near perfect case of specular reflection is a mirror. Generally, a specular reflection will attenuate the incident light slightly but will retain the spectral distribution of the incident light. Detecting the specular reflection of a scene means that the illuminant spectral can be determined.

The intensity of a specular patch can be expressed in terms of wavelength (k) as $I(k) = S_p(k) * P_s$, where $S_p$ = point source light intensity
and $P_s$ = specular coefficient.

It should be noted that $P_s$ does not depend on wavelength since body pigment absorption does not take place and all spectral components are equally reflected.

For a standard color imaging sensor with three spectral sensitive channels, r(k), g(k) and b(k): the tristimuli RG and B components can be defined as $R = \int_v S_p(k) * P_s * r(k) \, dk$
$G = \int_v S_p(k) * P_s * g(k) \, dk$
$B = \int_v S_p(k) * P_s * b(k) \, dk$, where v denotes the visible spectrum.

The light source spectral distribution can be better grasped by examining the ratios $R'_s$, $G'_s$, $B'_s$ of tristimuli components of the source $R_s$, $G_s$, $B_s$ where the multiplicative factor $P_s$ is cancelled out. These ratios can be derived from the above equation and can be shown to be:

$$R'_s = \frac{R_s}{\max(R_s, G_s, B_s)}$$

$$G'_s = \frac{G_s}{\max(R_s, G_s, B_s)}$$

$$B'_s = \frac{B_s}{\max(R_s, G_s, B_s)}$$

All ratios are normalized by the highest value and once the ratios have been obtained they can be used to correct for color in the acquired image.

Many techniques are known for adjusting the dynamic range of an acquired image in order to enhance a poorly captured image. One such technique is known as histogram equalization in which the form of a histogram representing the grey levels of the captured image is adjusted to conform with a predetermined shape. There are however two major disadvantages with histogram equalization. First, since histogram equlization is a non-linear point to point mapping of the pixel gray level, it causes distortion in the original image. Secondly, histogram equalization does not necessarily increase the entropy of the image because the histogram equalized image has at most the same number of discrete gray levels as the original image. When the total number of gray levels is small, equalization will cause entropy to decrease because different output gray levels can be grouped into the same output gray level. The histogram equalization technique is more suitable for image enhancement for human visual interpretation than it is for use in machine perception.

In the present system histogram equalization is not used and instead, as will now be described in greater detail, the parameters of the camera are adjusted dynamically to acquire an image with the equivalent to maximum entropy.

A good digital image should preserve the scene characteristics in terms of contrast, shading and intensity discontinues. High contrast sensitivity is desirable in order that smaller intensity increments can be detected. Intensity discontinuities and shading information are notably amongst the most important attributes in an image. These attributes are represented by the intensity gradient partial derivatives Ix, Iy, (shading information and intensity discontinuities can be represented by intensity partial derivatives, $I_x$, $I_y$) and by other higher order terms, as will be discussed in greater detail hereinafter. The aim therefore is to maximize the information content of absolute and derivative distributions.

A gray level histogram can provide a global description of the image intensity distribution over the effective dynamic range of the system. Entropy is a measure of the information content of an image and can be calculated from the gray level histogram in accordance with the equation $$H_n = - \sum_{i=0}^{n-1} p_i \log_2 (p_i) \quad (1)$$

Where $H_n$ is the entropy of the histogram n is the number of gray levels and $p_i$ is the posterior probability of the $i^{th}$ gray level occurring in the image. $P_i$ is calculated in accordance with the equation $$P_i = f_i/N,$$

where $f_i$ is the frequency of $i^{th}$ gray level in the image, and N is the total number of pixels in the image.

Maximum entropy occurs for a uniformly distributed intensity histogram. In this case the probability of each intensity level occurring is identical and it can be shown that $H_{max} = \log_2(n)$.

In practice it is unlikely that a real scene will ever have a flat grey level histogram and so, instead of searching for the maximum entropy $H_{max}$, an equivalent but more computationally efficient approach is to locate the minimum variance from a flat histogram. In this approach a flat histogram is used as a reference and since its mean frequency $\mu_h$ is a constant, i.e. $\mu_h = N/n$ the variance of the image histogram will be:

$$\sigma_h^2 = \frac{1}{n} \sum_{i=0}^{n-1} (f_i - \mu_h)^2 \quad (2)$$

In order to calculate the entropy $H_g$ of the intensity gradient it is only necessary to use the gradient magnitude, g.

$$g = (I_x^2 + I_y^2)^{\frac{1}{2}}$$

where the intensity partial derivatives $I_x$ and $I_y$ are $$I_x = \frac{dI}{dx} \text{ and } I_y = \frac{dI}{dy}$$

The gradient magnitude distribution spans a range from 0 to m levels, where m is the integer part of $\sqrt{2} n$. Therefore, $$H_g = - \sum_{g=0}^{m} P_g \log_2 (P_g) \quad (3)$$

where $P_g$ is the gradient probability, and $P_g = f_g/N$.

Figure 5:
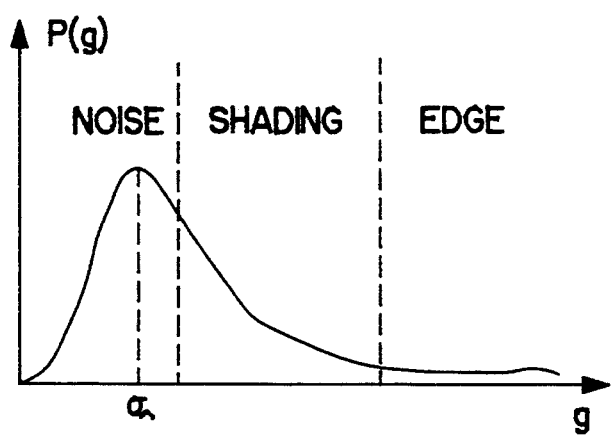
FIG. 5 is a graphical representation of the intensity gradient distribution of an image.

The reason for maximizing the information content of the magnitude of gradient distribution can be best justified by examining the physical content which this distribution carries. The magnitude of gradient distribution in an image is known to be approximately a Rayleigh distribution 18 as shown in FIG. 5 of the accompanying drawings. Referring to FIG. 5, the lower portion 19 of the distribution 18, including the peak, is mainly due to noise. The central part 20 of the distribution is contributed by shading in the image and the higher end 21 of the distribution corresponds to edges in the image. Therefore, maximizing the entropy of the magnitude of gradient distribution will also maximize the information content of shading and edges in the image assuming that the noise has a stationary white Gaussian distribution.

The abovementioned combined criteria require that the optimum aperture $f_{opt}$ of the acquired image will be such as to maximize both $H_n$ and $H_g$. i.e. $f_{opt}$ is a function of max $(H_n + H_g)$. (4)

In practice the above objective functions (1) to (4) are evaluated experimentally. It has been found that the intensity and gradient entropies $H_n$ and $H_g$ are correlated and this results in a reduction of the computational effort associated with the functions because maximizing the intensity entropy $H_n$ will also maximize the gradient entropy $H_g$.

It should be noted an advantage in adopting this approach is that focusing of the camera can be controlled in relation to the gradient magnitude g. Thus, by arranging the focus control 10 in FIG. 2 to receive the values of gradient magnitude g from the processing unit 14 such that by summing all values of g and adjusting the position of the lens to maximize the summation, the focus control 10 can control the camera such that the camera will be in focus when the maximum summation is found.

Typical entropy experimental results are illustrated in FIG. 6 of the accompanying drawings. These results were obtained for five different scenes, varying from an artifical scene comprising a single object at close range to a natural scene. Each of the graphs in FIG. 6 show as separate plots intensity entropy $H_n$, gradient entropy $H_g$, the combination of gradient and intensity entropy and the variance $\sigma_h^2$. FIG. 6 shows the four criteria for (a) a natural scene, (b) a single matt object, (c) a single specular object, (d) a mixture of different objects, and (e) a textured surface. In each case where an arrow is shown on the horizontal axis the arrow indicates the f-number that would be selected using conventional methods. In the case of graph (b) and (c) the conventionally selected f-number would be outside of the operating range and accordingly no arrow is shown.

Since calculation of the minimum variance from a flat histogram requires the least computation to determine $f_{opt}$ this is the preferred method of calculating $f_{opt}$, i.e. $f_{opt}$: min $(\sigma_h^2)$. (5)

Under very poor illumination conditions, aperture control alone is ineffective. The effectiveness of aperture control can be monitored by measuring the image entropy outlined in equation (1) above. An empirical entropy threshold, $\epsilon$, can be established such that $(H_n)_{max} > \epsilon$. An optimum aperture setting which fails to meet this expectation will indicate that the aperture control is inadequate. Such a situation could be overcome by active illumination of the scene by an external light source. However, the use of an external light source may be undesirable or impractical and in the absence of an external light source, an alternative solution is to modify the dynamic range of the system by controlling the black and white references to match that of the scene. In practice this is again achieved by adjusting the gain and offset of the amplifier.

Returning to FIG. 3 of the drawings, it can be seen that by adjusting the offset of the or each amplifier 12 the point at which the output from the amplifier 12 is zero can be made to correspond to the minimum luminance Lmin of the scene. Similarly, by adjusting the gain G of the amplifier the maximum output of the amplifier can be made to correspond to the maximum scene luminance Lmax. In this way, the characteristics of the electronics sub-system can be adjusted to assume that the maximum number of quantization levels in the ADC 13 are utilized for a given dynamic range of scene luminance Lmin to Lmax.

Intensity truncation distortion, underexposure and saturation, can be assessed from the cumulative density of the image, which is defined as $$F(i < \gamma) = \int_{-\infty}^{\gamma} p(i)\, di$$

On the probability histogram of the image, the probability density at the black and white levels, i.e. 0 and n-1 levels, are not their true values. The probability densities for the 0 and n-1 levels measured from the histogram are denoted by p*(0) and p*(n-1), and thus their true values are $p(0) = p^*(0) - F(i<0)$, and $p(n-1) = p^*(n-1) - F(i>n)$, where p(0) and p(n-1) are respectively the true probability densities for the black and white levels of the acquired image and can be approximated by the values of their neighbors based on the assumption that most histograms are smooth and continuous. Therefore, p(0) ≈ p(1)
p(n-1) ≈ p(n-2).

The cumulative densities for the underexposed and saturated gray levels are $F(underexposure) = F(i<0) = p^*(0) - p(1)$ $F(saturation) = F(i>n) = p^*(n-1) - p(n-2)$ Therefore a control strategy for black/white reference is to limit the underexposure and saturation to a pre-defined tolerance such that, $0 < F(underexposure) \pm \epsilon_u$ $0 < F(saturation) \pm \epsilon_g$. (6)

The test for greater than 0 is to ensure that the lowest and highest levels are occupied. Without this condition, even under-occupied histogram will pass the test. As an example if only 1% of the total number of pixels is allowed to be truncated, then $\epsilon_u$ and $\epsilon_g$ should be set to 0.005.

The results of an experiment in which the black and white references were adjusted to improve the entropy as well as to reduce dynamic range truncation showed that the original histogram had a large proportion of gray levels not occupied and the improved image had an entropy of 7.29 bits/pixel which indicates an efficient utilization of the systems dynamic range (8 bits). In this case the total truncation distortion was controlled to be under 0.3% and the effective dynamic range could be located anywhere within the dynamic range of the photodetectors (it should be noted that ultra-wide dynamic range charge-couple devices of more than 60 dB are available commercially).

The above described embodiment of the invention thus provides for dynamic adjustment of parameters associated with the image source in order to obtain a digital image containing the maximum amount of useful information about the scene represented by the image.

The invention can be applied to any image processing system in which images to be processed are acquired from an image capturing source and is not limited in application to machine vision or artificial intelligence systems.

Having thus described the present invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

I claim:
1. An image acquisition system comprising:
   (a) an electronic camera having a lens with a selectively adjustable aperture control:
   (b) an amplifier coupled to said camera to receive image data therefrom, said amplifier having selectively adjustable gain and offset controls;
   (c) a digitizer coupled to said amplifier to receive amplified image data therefrom; and
   (d) a processor coupled to said digitizer to receive digitized image data therefrom, said processor having outputs coupled to said amplifier gain and offset controls for selectively adjusting the same, and an output connected to said lens aperture control for selectively adjusting the same;
   (e) said processor being adapted to process said digitized image data received from said digitizer to calculate therefrom an intensity entropy of an image and, in response thereto, to provide outputs selectively to said amplifier gain and offset controls and said lens aperture control for selectively adjusting the same to optimize the acquired image information, said intensity entropy of said image being defined as $H_n$, where:

$$H_n = -\sum_{i=0}^{n-1} p_i \log_2(p_i)$$

and n = the number of quantized intensity levels of the digitizer, and $P_i$ = the probability of the $i^{th}$ intensity level occurring in the image and is defined by $p_i = f_i/N$ where f is the frequency of occurrence of the $i^{th}$ intensity level in the digitized image data and N is the total number of pixels in the digitized image data.

2. An image acquisition system as claimed in claim 1, wherein said processor is adapted to derive a histogram of the image intensities in the digitized image data received from the digitizer and to calculate the intensity entropy $H_n$ of the image from said histogram.

3. An image acquisition system as claimed in claim 1, wherein said processor is further adapted to identify specular reflections in the digitized image and, in response thereto, to provide outputs selectively to said amplifier gain and offset controls and said lens aperture control for selectively adjusting the same.

4. An image acquisition system as claimed in claim 3, wherein said processor is adapted to identify specular reflections as digitized image intensity values above a predefined intensity threshold.

5. An image acquisition system as claimed in claim 4, wherein said processor is adapted to determine the dynamic range of the image by determining the ratio of image intensity changes in two captured images acquired under different settings of said amplifier gain and offset controls and said lens aperture control, and to determine said predetermined intensity threshold as a function of the determined dynamic range.

6. An image acquisition system as claimed in claim 5, wherein said processor is adapted to determine said dynamic range from the maximum and the minimum intensity values in said two captured images.

7. An image acquisition system as claimed in claim 3, wherein said processor is adapted to process image data associated with detected specular reflections to determine a color content thereof and, in response thereto, to normalize the color content of acquired images to compensate for color variations between images caused by changes in image illumination.

8. An image acquisition system as claimed in any one of claims 1 to 7, wherein the lens of said electronic camera also has a selectively adjustable focus control, and said processor also has an output coupled to said focus control for selectively adjusting the same to optimize the acquired image information.

9. An image acquisition system comprising:
(a) an electronic camera having a lens with a selectively adjustable aperture control;
(b) an amplifier coupled to said camera to receive image data therefrom, said amplifier having selectively adjustable gain and offset controls;
(c) a digitizer coupled to said amplifier to receive amplified image data therefrom; and
(d) a processor coupled to said digitizer to receive digitized image data therefrom, said processor having outputs connected to said amplifier gain and offset controls for selectively adjusting the same and an output connected to said lens aperture control for selectively adjusting the same;
(e) said processor being adapted to process said digitized image data received from said digitizer to calculate therefrom an intensity gradient entropy of said image and, in response thereto, to provide outputs selectively to said amplifier gain and offset controls and said lens aperture control for selectively adjusting the same to optimize the acquired image information, the intensity gradient entropy of the image being defined as $H_g$, where:

$$H_g = - \sum_{g=0}^{m} P_g \log_2(P_g)$$

and the intensity gradient magnitude being defined as g, where:

$$g = (I_x^2 + I_y^2)^{\frac{1}{2}}$$

and the intensity partial derivatives $I_x$ and $I_y$ are $$I_x = \frac{dI}{dx} \text{ and } I_y = \frac{dI}{dy}$$

and m = the number of levels spanned by the gradient magnitude distribution of the quantized intensity levels of the digitizer; and $p_g$ = the probability of the $g^{th}$ intensity gradient level occurring in the image and is defined by $p_g = F_g/N$, where $f_g$ is the frequency of occurrence of the $g^{th}$ intensity gradient level in the digitized image data and N is the total number of pixels in the digitized image data.

10. An image acquisition system as claimed in claim 9, wherein said processor is adapted to derive a histogram of the image intensities in the digitized image data received from the digitizer and to calculate the intensity gradient entropy Hg of the image from said histogram.

11. An image acquisition system as claimed in claim 9, wherein said processor is further adapted to identify specular reflections in the digitized image and, in response thereto, to provide output selectively to said amplifier gain and offset controls and said lens aperture control for selectively adjusting the same.

12. An image acquisition system as claimed in claim 11, wherein said processor is adapted to identify specular reflections as digitized image intensity values above a predetermined intensity threshold.

13. An image acquisition system as claimed in claim 12, wherein said processor is adapted to determine the dynamic range of the image by determining the ratio of image intensity changes in two captured images acquired under different settings of said amplifier gain and offset controls and said lens aperture controls and to determine said predetermined intensity threshold as a function of the determined dynamic range.

14. An image acquisition system as claimed in claim 13, wherein said processor is adapted to determine said dynamic range from maximum and minimum intensity values in said two captured images.

15. An image acquisition system as claimed in claim 11, wherein said processor is adapted to process image data associated with detected specular reflections to determine a color content thereof and, in response thereto, to normalize the color content of acquired images to compensate for color variations between images caused by changes in image illumination.

16. An image acquisition system as claimed in any one of claims 9 to 15, wherein the lens of said electronic camera also has a selectively adjustable focus control, and said processor also has an output coupled to said focus control for selectively adjusting the same to optimize the acquired image information.

17. An image acquisition system comprising:
(a) an electronic camera having a lens with a selectively adjustable aperture control;
(b) an amplifier coupled to said camera to receive image data therefrom, said amplifier having selectively adjustable gain and offset controls;
(c) a digitizer coupled to said amplifier to receive amplified image data therefrom; and (d) a processor coupled to said digitizer to receive digitized image data therefrom, said processor having outputs connected to said amplifier gain and offset controls for selectively adjusting the same, and an output connected to said lens aperture control for selectively adjusting the same;

(e) said processor being adapted to process said digitized image data received from said digitizer to derive a histogram of the image intensities in said digitized image data and to calculate therefrom the variance of the image intensities from a reference histogram and, in response thereto, to provide outputs selectively to said amplifier gain and offset controls and said lens aperture control for selectively adjusting the same to optimize the acquired image information, said variance being defined as $\sigma_h^2$, where $$\sigma_h^2 = \frac{1}{n} \sum_{i=0}^{n-1} (f_i - \mu_h)^2$$

and n = the number of quantized intensity levels of the digitizer $f_i$ — the frequency of occurrence of the $i^{th}$ intensity level in the digitized image data, and $\mu_h = N/n$, where N is the total number of pixels in the digitized image data.

18. An image acquisition system as claimed in claim 17, wherein said processor is further adapted to identify specular reflections in the digitized image and, in response thereto, to provide outputs selectively to said amplifier gain and offset controls and said lens aperture control for selectively adjusting the same.

19. An image acquisition system as claimed in claim 18, wherein said processor is adapted to identify specular reflections as digitized image intensity values above a predefined intensity threshold.

20. An image acquisition system as claimed in claim 19, wherein said processor is adapted to determine the dynamic range of the image by determining the ratio of image intensity changes in two captured images acquired under different settings of said amplifier gain and offset controls and said lens aperture control, and to determine said predetermined intensity threshold as a function of the determined dynamic range.

21. An image acquisition system as claimed in claim 20, wherein said processor is adapted to determine said dynamic range from maximum and minimum intensity values in two captured images.

22. An image acquisition system as claimed in claim 18, wherein said processor is adapted to process image data associated with detected specular reflections to determine a color content thereof and, in response thereto, to normalize the color content of acquired images to compensate for color variations between images caused by changes in image illumination.

23. An image acquisition system as claimed in any one of claims 17 to 22, wherein the lens of said electronic camera also has a selectively adjustable focus control, and said processor also has an output coupled to said focus control for selectively adjusting the same to optimize the acquired image information.

* * * * *